United States Patent [19]

Tsipov

[11] Patent Number: 5,253,373
[45] Date of Patent: Oct. 19, 1993

[54] TOILET

[76] Inventor: Mikhail Tsipov, 30-26 Brighton 14 St. Apt. C5, Brooklyn, N.Y. 11235

[21] Appl. No.: 881,355

[22] Filed: May 11, 1992

[51] Int. Cl.⁵ .............................................. E03D 1/33
[52] U.S. Cl. .................................................. 4/343; 4/447
[58] Field of Search ............... 4/662, 663, 664, 665, 4/666, 667, 447, 300, 343, 344

[56] References Cited

U.S. PATENT DOCUMENTS

| | | | |
|---|---|---|---|
| 2,198,605 | 4/1940 | Faber | 4/300 |
| 2,774,078 | 12/1956 | Pazos | 4/447 |
| 2,875,450 | 3/1959 | Umann | 4/447 |
| 3,781,919 | 1/1974 | Ayala | 4/447 |
| 3,995,326 | 12/1976 | Umann | 4/447 |
| 4,094,018 | 6/1978 | Bemthin | 4/447 |
| 4,183,105 | 1/1980 | Womack | 4/300 |
| 4,206,520 | 6/1980 | Fulford | 4/665 |
| 4,237,560 | 12/1980 | Riegelman et al. | 4/447 |
| 4,718,131 | 1/1988 | Kitamura et al. | 4/312 |
| 4,953,238 | 9/1990 | Shifferly | 4/447 |

Primary Examiner—Henry J. Recla
Assistant Examiner—Charles R. Eloshway
Attorney, Agent, or Firm—Ilya Zborovsky

[57] ABSTRACT

A toilet unit has a toilet room with at least one corner, and a toilet arranged in the corner and including an upper water tank for supplying water, a lavatory basin-bidet, a seat associated with the basin-bidet, a spraying device associated with the seat of the basin-bidet for spraying in the latter, a device for heating water supplied for spaying and air supplied for drying, controlling elements conveniently located at a level of the seat. Elements of the tank including a float, a frame on which a valve member of a water supplying valve is arranged, and a pulley of a cable for a water discharging valve are turnable about a single axis which extends perpendicularly to a diagonal plane of symmetry of the water tank.

4 Claims, 5 Drawing Sheets

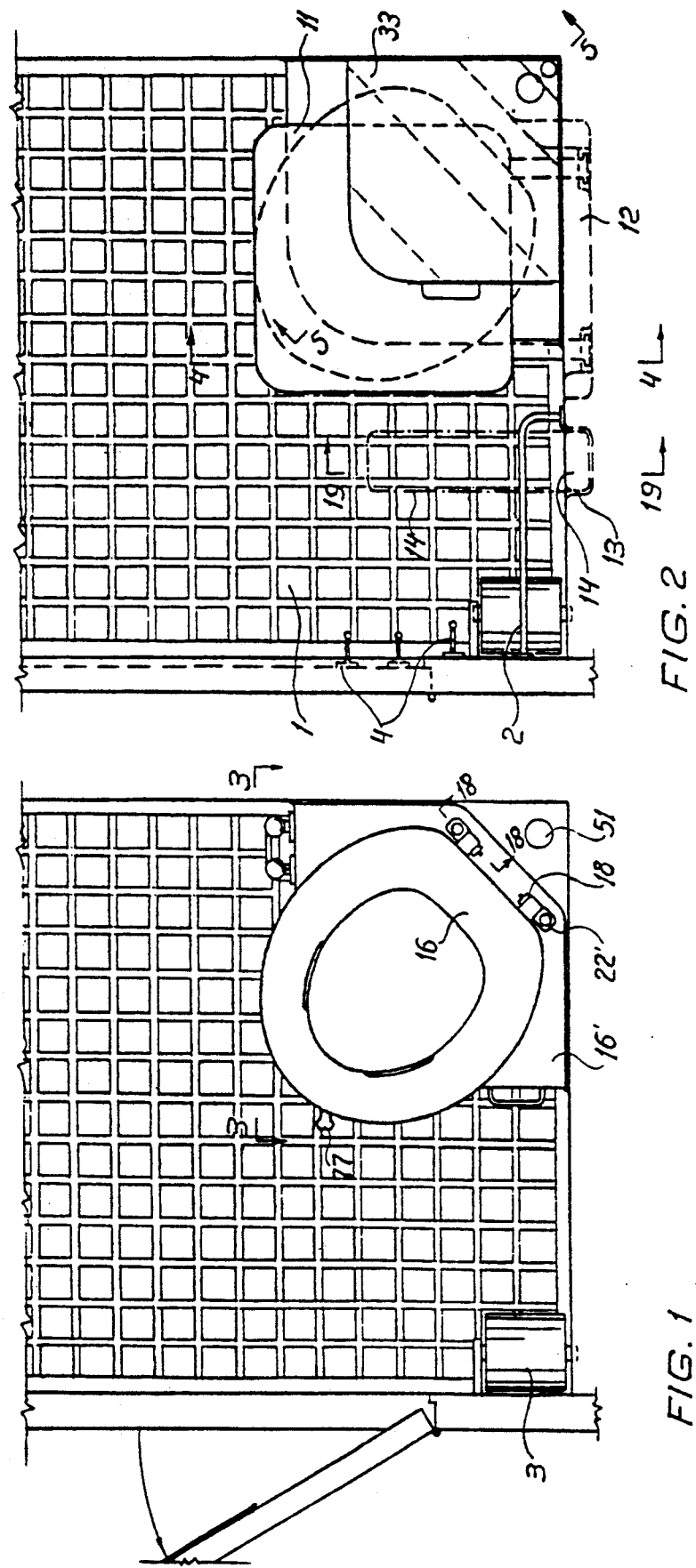

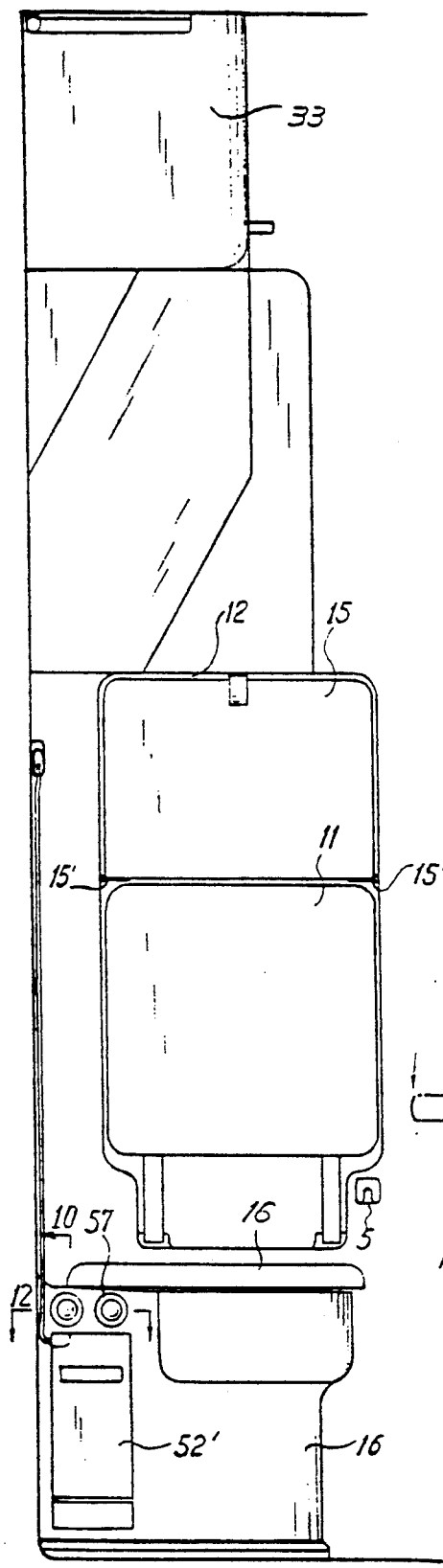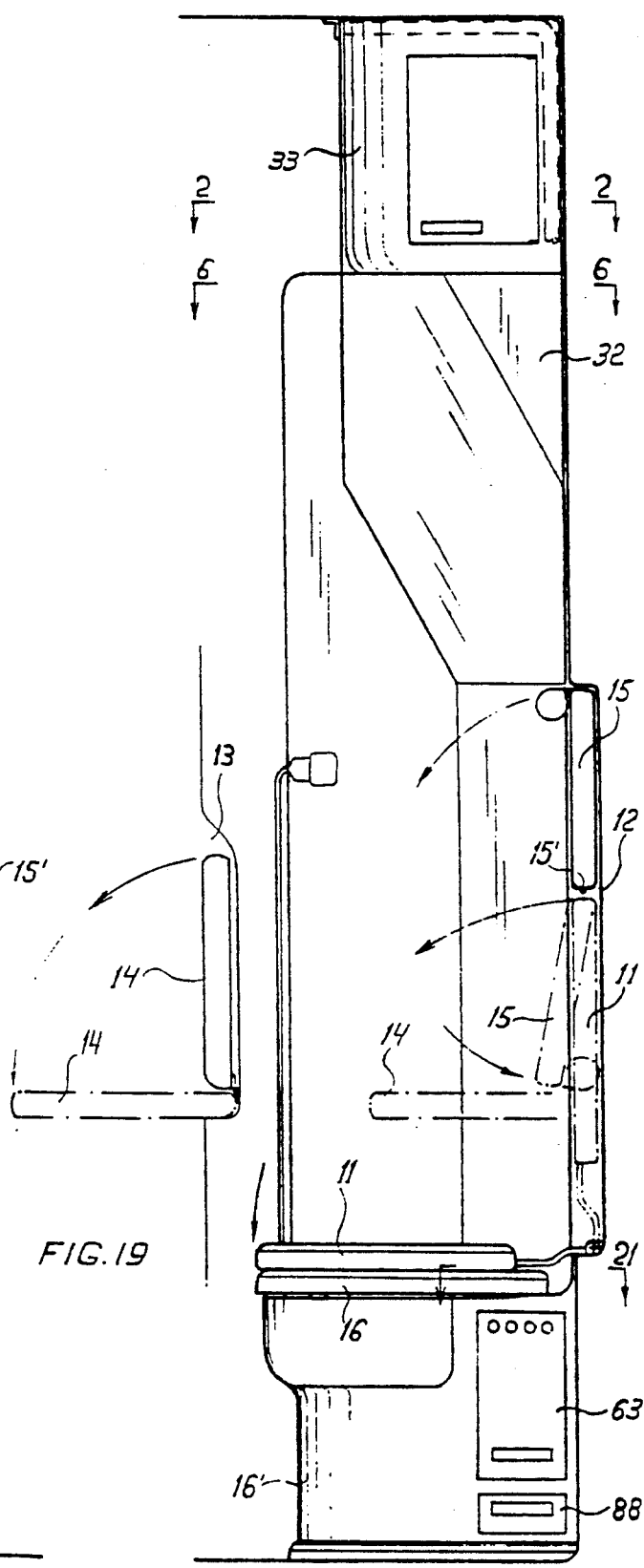

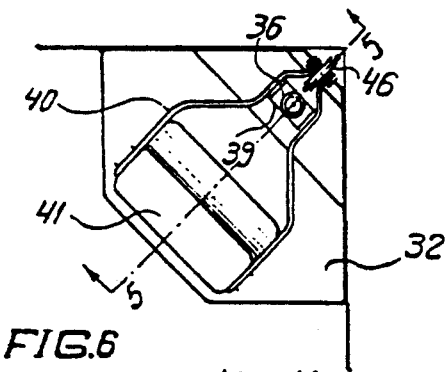
FIG.6
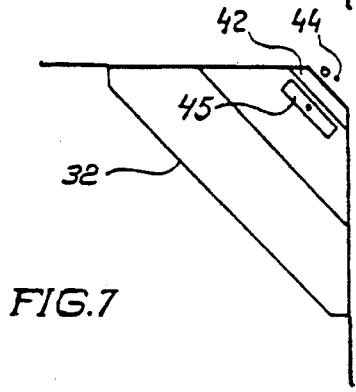
FIG.7
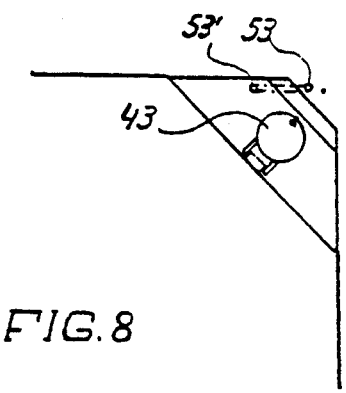
FIG.8
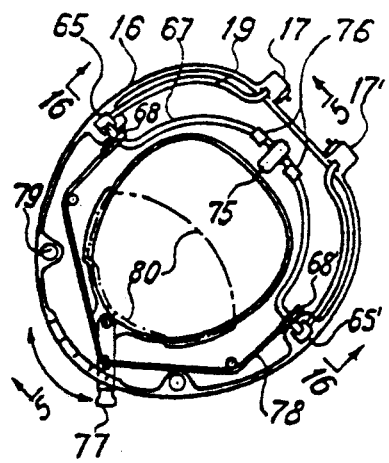
FIG.14
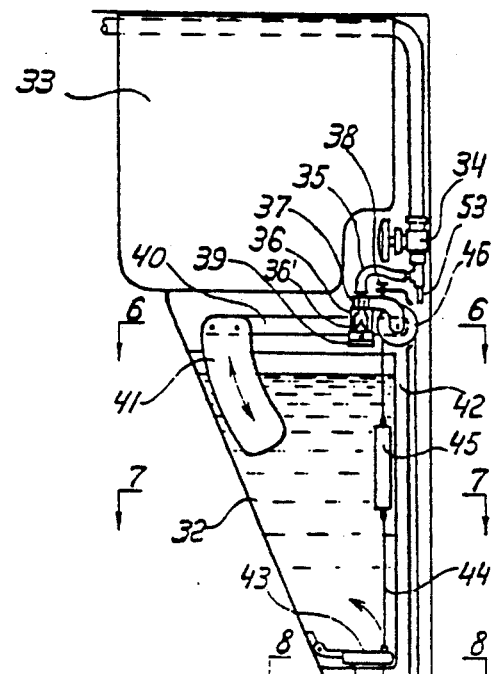
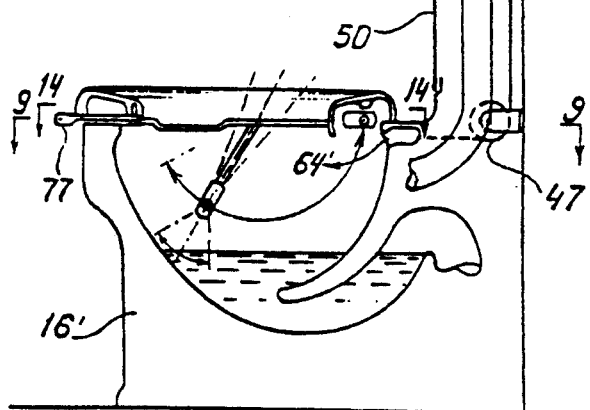
FIG.5

5,253,373

TOILET

BACKGROUND OF THE INVENTION

The present invention relates to toilets, and more particularly to such toilets which combine several functions.

Toilets are widely known and used for sanitary purposes in dwellings of various types. In many instances it is desirable or even necessary to make such toilets which occupy as little space as possible. It is to be understood that it is desirable to further improve such toilets in the sense of reducing a space and increasing convenience of its use, as well as making them a universal device.

SUMMARY OF THE INVENTION

Accordingly, it is an object of the present invention to provide a toilet which occupies very little space and can be considered as being supercompact. It is also an object of the present invention to provide a toilet which is arranged so that it occupies little space and permits accommodating other objects in a corner near it, such as toilet paper, holders for towels, holders for clothes and a space for shoes.

In keeping with these objects and with others which will become apparent hereinafter, one feature of the present invention resides, briefly stated, in a toilet with a lavatory unit accommodating a bidet, a rest chair, a hair dryer, a storage for clothes, and a storage for bidet accessories, and the above mentioned elements are formed and arranged so that the user stands on the floor in the same place when using any of the above listed units.

When the toilet is designed in accordance with the present invention, it occupies a minimum possible space, it is extremely compact and at the same time it is very convenient to use.

The units are not compromised as to their size and they correspond to the widely accepted standards. The lavatory unit is formed as a combination of lavatory basin-bidet with washing and drying devices, additional units for heating, sauna, hair drying, etc., and can be accommodated in any bathroom. The arrangement of the units is based on the novel inventive idea that the same area of the floor is used by a user during his alternating usage of the respective units.

The compact unit releases another adjacent corner for needed objects and space, such as a space on the floor for shoes, towel holders, toilet tissues, place for clothes with hangers.

The lavatory basin unit provided with the above mentioned auxiliary elements is located in a corner of a bathroom. A water tank of the lavatory basin has a new construction and is also arranged in the corner, and it further reduces the area occupied by the toilet. The new toilet can be used in bathrooms of houses, apartments, condos with several bedrooms, hotels and motels, mobile houses and inexpensive modular homes, ship compartments, factories.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a plan view of a part of a bathroom in accordance with the present invention with the lavatory basin unit;

FIG. 2 is a plan view of the bathroom including an upper level with a cover of the lavatory unit, upper storage, and other elements;

FIG. 3 is a vertical fragment with a view of the right side of a combined lavatory basin-bidet and raised upper seat and back;

FIG. 4 is a vertical fragment of a left side of the combined lavatory basin-bidet;

FIG. 5' is a vertical transverse section of the rear part of the lower seat of the basin-bidet with a view showing a cartridge for spraying, magnets and a chamber for receiving water with a coupling;

FIG. 6 is a horizontal transverse section of the combined lavatory basin-bidet with a view of an upper part of a water supplying tank;

FIG. 7 is a horizontal transverse cross-section of the combined lavatory basin-bidet along the water tank;

FIG. 8 is a horizontal transverse cross-section of the combined lavatory basin-bidet above a draining valve;

FIG. 14 is a horizontal section of the lower seat of the combined lavatory basin-bidet, with a view of a movable arc with a jet head and their control;

FIG. 16' is a vertical transverse section of the left part of the seat of the lavatory basin-bidet with a view showing a control unit for the arc and a chamber for receiving and discharging hygiene solution from a supply pipe into the arc;

FIG. 19 is a vertical cross-section of the arm rest;

DESCRIPTION OF THE PREFERRED EMBODIMENTS

Figure 9:
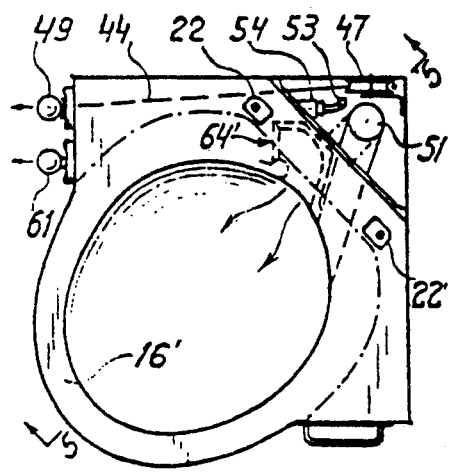
FIG. 9 is a horizontal transverse section of the combined lavatory basin-bidet above a body of the lavatory basin without a lower seat.

A toilet in accordance with the present invention has a combined lavatory basin-bidet with several elements, such as a rest chair, a hair dryer, a hygiene solution source, accessories, a water tank, etc. The combined unit can be located in the bathroom in a straight arrangement and in a corner arrangement. The corner arrangement shown in the drawings provide for a greater space economy. The unit is located so that its longitudinal axis of symmetry coincides with a center line of one of the corners of the bathroom. The body of the combined unit closes its corners and facilitates the maintenance of a clean unit. A hollow inner space can be used for accommodation of all required devices as will be explained hereinbelow.

The lavatory basin-bidet 16' has a cover-seat 11 of a rectangular shape, which when open turns toward one wall of the corner. The cover-seat is then accommodated in a special recess which is formed in this wall and identified as 12. The recess can be formed between two vertical studs of a partition. A second recess can be made near the first one as identified with 13. It can accommodate a withdrawable arm support 14 shown in FIG. 19. The recess 12 can also accommodate a special insert which forms a backrest 15 turnable on axles 15'. The backrest, the seat and the arm supports can be soft and therefore provide a special comfort for a sitting user, for example during taking a sauna or drying hair.

The basin-bidet 16' has a special seat 16. Its bottom surface has a downwardly open cavity for accommodating special devices. The seat shown in FIGS. 14 and 18 can be easily lifted by turning about rear half pins which extend through chambers 17 and are formed as bushings 18. The bushings have two functions. They form a pivot axis and at the same time passages for conveying a liquid. They serve as a coupling. For this purpose the chambers 17 are cast together with the seat 16 and also have a double function. The chamber is a support for the seat, in which the bushing 18 made for example from Teflon is screwed, and at the same time the chamber receives the liquid flowing from a T-shaped inner passage of the bushing 18 to pass it into a pipe 19 extending from the side of the seat. For this purpose the bushing, in addition to a thread in its wider part, has an annular passage 20 on its surface so that, the liquid exiting the T-shaped inner passage of the bushing flows into the opening of the pipe 19 located opposite to the passage. Before screwing into the chamber 17, a standard rubber washer is fitted on the narrow part of the bushing and remains in the chamber 17 for hermetization of the opening for the half-pin. The opposite side is hermetized by the conical thread of the bushing. For screwing the bushing, its head is provided with a transverse rib 21.

In order to remove the seat 16, the bushing is screwed out so as to withdraw the half-pin 18' from the wall of the chamber 22. In the event if the tightness is reduced during use of the toilet, the bushing 18 is screwed a little to increase the tightness in a face stop. The chambers 22 and 22' form supports, on which the seat 16 with the bushings 18 can be turned. They also form the chambers for passing the liquid from the pipes extending along the devices which will be described hereinbelow. The chambers 22 and 22' are hermetically closed by screwing covers 23.

A water tank 32 of the lavatory unit is located above the basin-bidet 16', also in a corner arrangement. Thereby a person of any height can easily sit down and stand up for using the basin-bidet. Instead of the cover, a removable box 33 is located above the tank and can serve for example for storing of removed clothes.

Figure 5:
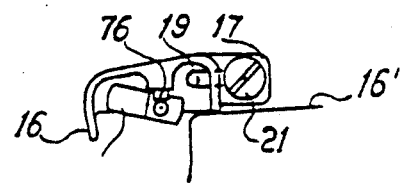
FIG. 5 is a vertical longitudinal section of the combined lavatory basin-bidet, taken along the axis and plane of symmetry 5—5.

A standard stop valve 34 is located on a supply pipe of the lavatory unit as shown in FIG. 5. A short hose 35 is fitted from below on a part of a T and supplies water to a spherical valve 36. The valve 36 is mounted on a fork 37 supported on an adjusting screw 38. A conical valve member 36' is inserted in a seat of the valve and withstands higher pressure from tap water than a conventional valve member. The conical valve member 36' is arranged on a rubber pad fixed on a partition 39 of a frame 40 of a float 41. The fork 37 with the nozzle of the valve 36 and the frame 40 with the flap are supported on one turning axle. This insures an accurate fit of the valve member in the seat. The float 41 on the frame 40 is designed to produce a required force to withstand any high pressure of the water supply. The elements 36, 36', 40, 41 are located in the longitudinal plane of symmetry of the tank 32 as can be seen from FIGS. 5, 6.

Figure 12:
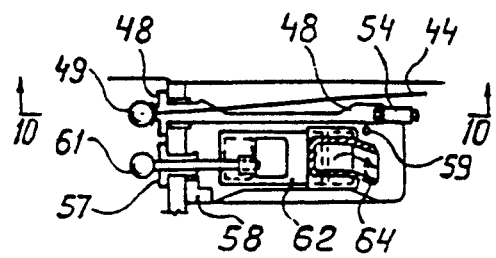
FIG. 12 is a horizontal section of a space above the box with control elements for water drainage from a water tank, water supply for spraying in a basin-bidet, heating of water and air, and air supply for drying.

The rear part of the water tank has a double wall which forms an overflow passage 42 for receiving an excess water in the tank in event of any casualties. The lower part of the water tank has a water drainage valve 43 formed as a hollow rubber and operable by a rope or chain 44 with a weight 45. The weight 45 is connected with the rope 44 which passes through a pulley 46 and extends downwardly through a pulley 47 to pass under the top of the basin body through a tube 48 and to be connected there to a ball 49 as shown in FIGS. 5, 9, 12. For servicing the rope 44, a plate 50 is made removable. The pulley 46 is located in a space of the rear wall of the water tank on the common axis with the frame 40 and the fork 37 and mounted on the same ball as shown in FIGS. 5 and 6.

The ball 49 is located in the upper part of the right wall of the basin body which serves as a control corner, for convenience of using by a sitting user. The user can pull the ball 49 forwardly for example by 3 inches and thereby open the valve 43 to open the water flushing the basin receptacle. The thus returned ball will be retained by the rope 44 which will be pulled by the weight 45. The draining valve 43 which accommodates air and has buoyancy will rest on its seat under the action of the remaining portion of water.

A second bottom of the water tank is located under the draining valve 43 and connected with a water falling pipe 51. The pipe 51 can supply water into the receptacle of the basin in a conventional manner. At the same time, the water can be supplied tangentially as shown in FIG. 9. With this type of water supply, the water flushes the walls of the receptacle, causes twisting of the water stream and improves syphoning. This solution leads to laminary stream without noise and splashes and to a simplified construction of the lavatory basin.

All parts and working elements of the water tank 32 are assembled in a single unit and operate in a single plane coinciding with the section 5—5.

The lavatory basin can be provided with spraying and drying mean. This eliminates the need in toilet tissues and dirtying of hands. The equipment for this purpose includes means for preparation and supply of water, preparation and supply of hot air, receipt of water for spraying and receipt of air for drying.

The preparation of water for example its heating in winter, and also the preparation of heated air are performed in a two-chamber box 52 located in the right wing of the basin-bidet 16' or in other words in the control corner. Water is supplied to the box through a pipe 53 connected to the T under the valve 34, or from the tank 32 through a pipe 53' connected to the bottom of the tank as shown in FIG. 8 and to a plug valve 54. When the plug valve opens, water flows into a coil 55 located in the rear chamber of the box 52. The plug valve opens and closes the water supply and also adjusts the water pressure. The plug valve is controlled by a round handle of the tube 48 at the front of the control corner, as can be seen from FIG. 12. The tube 48 has a trapezoidal cutout for the rope extending to the ball 49, and ends in a flange engaging with the stem of the plug valve 54. The tube 48 has a small turning angle of for example 90°, to insure a constant opening of the cutout for unobjectionable movement of the rope 44.

Heating of water for 2-3 minutes consumption is performed locally, for example by a hot air which is electrically heated. Such heating is very efficient, taking into consideration that the hot air will be immediately used for drying. For this purpose the front chamber of the box 52 accommodates a compact device 56 with an electric fan and electric heating coil, such as for example used in compact hair dryers and is provided with three modes of heating. The device can be also directly used for hair drying. The front wall 52' of the front chamber of the box is turnable for easy mounting and removal of the device 56 when needed. The electric cord of the device can be extended and plugged into a plug hole. The device is inserted in an upside-down position. Its working part formed as a cylinder is seated in fixing members which insure a desired position of the cylinder in the chamber. The cylinder adjoins the round opening in the partition between the chambers of the box.

Figure 11:
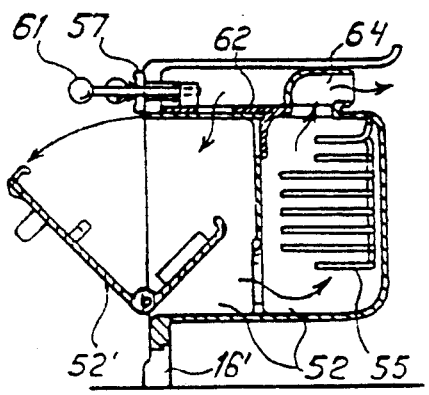
FIG. 11 is a vertical longitudinal section of the two-chamber box with a view showing the switching of an air valve and opening of a front chamber of the box.
Figure 10:
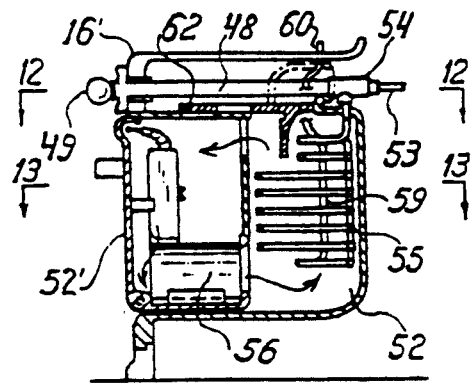
FIG. 10 is a vertical longitudinal section of two-chamber box in a right lower part of the body of the combined lavatory basin-bidet, for preparing air and water to be supplied for washing and drying.
Figure 13:
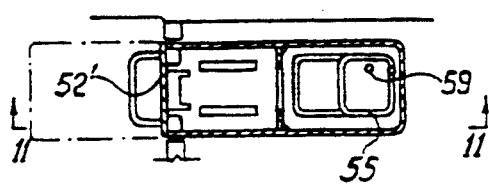
FIG. 13 is a horizontal section of the two-chamber box with a coil for water in a rear chamber and stops for a mobile drying device in the front chamber.

The coil for water heating in the inner chamber of the box 52 is composed of a thin-walled pipe with a diameter for example one-fourth of an inch. Non-ferrous metals and silver can be used for example as the materials of the coil. Its length is to be calculated, and can be selected for example at 8 feet. Highly efficient heat transfer produced here permits a momentary heating of water. For turning on the water heating, the device 56 is switched on by a round handle 57, which turns an intermediate electric switch 58 located also in the control corner, as can be seen in FIGS. 11 and 12. Air starts circulating in the box between its chambers as shown in FIG. 10. Hot air supplied by the device 56 will flow around the coil 55 with water and leave the upper opening between the chambers into the front chamber. In the front chamber it is sucked by the fan into the device 56 and again supplied into the rear chamber.

The thus prepared water is supplied from the coil 55 through a pipe 59 to a nipple 60. The nipple is inserted in the chamber 22 and mounted to the upper part of the toilet. A rubber washer on a disc is arranged below, and a nut with a thread is arranged above as shown in FIGS. 9, 10, 18 and 21.

For transition to preparation and supply of hot air for drying, it suffices to pull the spherical handle 61 to the left as shown in FIGS. 9, 11, 12. The handle pulls an inter-chamber T-shaped valve 62 which is then moved, closes the upper opening between the chambers, and opens two openings in the chambers' ceiling as shown in FIG. 11. Through the thusly opened opening of the front chamber, air is aspirated from the interior cavity of the basin. The air flows into the body through the openings in the front wall of the box 63 as shown in FIG. 4. Finally, air which has been heated in the device 56 flows through the upper opening of the rear chamber into a vertical passage 64 which supplies a hot air to a horizontal knee 64'. Then the air comes through an outlet toward the center of the basin as shown in FIGS. 9, 5, 11, 12.

Figure 16:
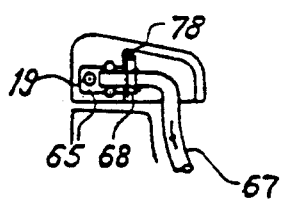
FIG. 16 is a vertical transverse section of the right part of the lower seat of the lavatory basin-bidet with a view showing a water supply from the supply pipe into a water receiving chamber in the seat and then from the chamber into the movable arc of the seat.
Figure 16:
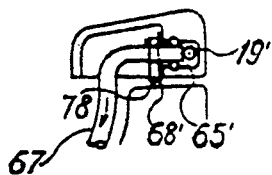
Figure 18:
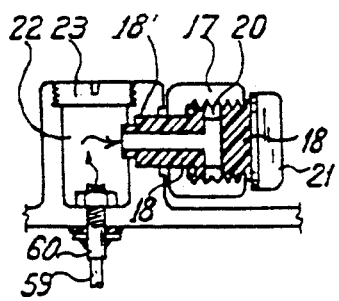
FIG. 18 is a vertical section of the right unit of the water supply chambers connected with the coupling for turning the lower seat of the basin-bidet and transferring the water.

Receipt of water for spraying is performed by a seat of the lavatory basin, which has a water receiving chamber 22. From the chamber 22 through the bushing 18 the water flows into the chambers 17 and from the chambers 17 through the pipe 19 mounted in the seat flows into the chamber 65 as shown in FIGS. 14 and 18. The seat accommodates a special arc formed for example as a thick-walled metal pipe 67 with bent away ends extending to the chambers 65, 65'. At the other side from the water receiving chambers, chambers 22', 17' and 65' are provided for hygiene solutions. Half pulleys 68, 68' are fitted on the pipe of the arc at the side of the chambers 65, 65'. Both ends of the arc 67 are introduced alternatingly into the right and left chambers, and then round washers for example of Teflon are fitted on the ends as seen in FIGS. 14, 16, 16'.

Figure 15:
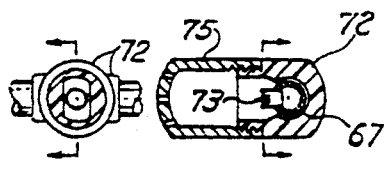
FIG. 15 is a view showing a cartridge of the jet in longitudinal and transverse sections.

A spray cartridge is arranged in the center of the arc 67 and shown in FIGS. 5, 14, 15, 5'. The cartridge for example can have four elements, namely a holder 72, a nipple 73, and an insert-injector 74 and a head 75. The holder 72 is formed as a chamber which can be cast for example of Teflon, so that it is elastic and can be fitted on one end of the arc to maintain a tight fit and prevent water loss. At the same time it allows its turning on the pipe of the arc when needed. For this purpose the inner chamber of the holder which accommodates the nipple has a rectangular shape, as shown in a cross-section in FIG. 15. This shape allows turning of the holder with the cartridge until the abutment against the nipple, in two directions by an angle of for example 60°. The same nipple limits the movement of the cartridge along the pipe of the arc.

The nipple 73 has an end with a thread and a slot for a screwdriver. It is mounted in an opening in the arc, provided in its center and extending over its radius. The nipple serves for supplying water into the cartridge for spraying and fixes the insert-injector in the pipe.

Figure 17:
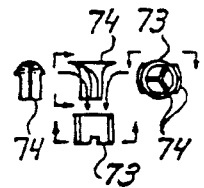
FIG. 17 shows a nipple of the cartridge and an insert-injector, with the insert from a side, above and front view of the nipple.

The insert-injector 74 is cast, for example, from an elastic, plastic material as shown in FIG. 17. It has such a shape that its rear part can be tightly pressed against the inner wall of the pipe of the arc, and its side parts can receive two streams of liquid from the left and from the right and direct them into the nipple. The central tail portion is tightly inserted in the nipple and divides its section, for example into three parts. Such three-passage tail portion can receive water from the left side and discharge it through two passages, and receive another liquid from the right side and discharge it through one passage. The nipple with the insert will form an injector which provides first supplying tap water into the cartridge and spraying of clean water, and supplying tap water which at any pressure will inject in the nipple another liquid with a free flow into the pipe, so as to mix with the same and to be discharged.

A head 75 of the cartridge can be formed as a single head or as split double head and composed of metal which is chromium-plated. The head has an inner chamber with drilled holes which produce a spray, and for example an inner thread for screwing onto a thread provided on the holder of the cartridge.

For fixing and retaining the arc with the cartridge in a lifted, horizontal position, the seat is provided with two magnets at both sides of the cartridge and identified with 76 and shown in FIGS. 5' and 14. The pipe of the arc can be made of the material which interacts with the magnets such as stainless steel.

For supplying the spray from any selected position or in other words for controlling the arc with the cartridge, the front part of the lavatory basin is provided, in a convenient place close to the user's hand, with a regulating lever 77 as shown in FIG. 5 and 14. The lever 77 is mounted on the lower side of the front part of the seat 16 and connected by ropes with half-pulleys 68, 68' arranged on the right and left ends of the arc-shaped pipe 67 shown in FIGS. 16, 16'. The lever is spring-biased in a vertical direction and engages with the seat 16 in any position of the lever. The ropes from the lever at the right and at the left embrace the sliding supports and are fixed in certain points on the surface of the semi-pulleys. In order to select the position for the spray head 75, the lever 77 must be pressed downwardly, turned to a required position and lowered. At this point the lever is self-fixed and fixes the position of the spray head 75.

In order to prevent a strike of the seat against the base of the lavatory basin, rubber dampers 79 are provided at both sides under the seat as shown in FIG. 14.

When a user starts washing the lower parts of the body, it can turn on the water without lowering of the cartridge. The cartridge which is then located in its chamber under the seat, will be flown around, and the rear part of the seat is washed from inside and obtains the temperature of water. When the user feels that water has the desired temperature, it places the spray to a desired position.

Figure 20:
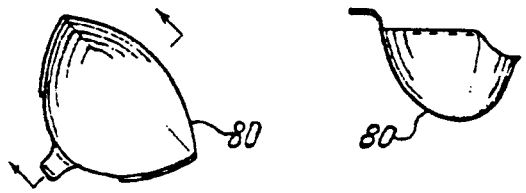
FIG. 20 is a plan view and a transverse section of the insert for preparing and manual use of hygiene solutions.

Two further devices are also provided for the combined basin-bidet of the present invention, for preparing and using hygiene solutions. A first device includes an insert 80 as shown in FIG. 20 an formed as a vessel with a short handle which is inserted into the seat of the lavatory basin and supported with its left and right side on special recesses formed on the seat as shown in FIGS. 5 and 14. The insert is provided for preparation and manual use of hygiene solutions.

Figure 21:
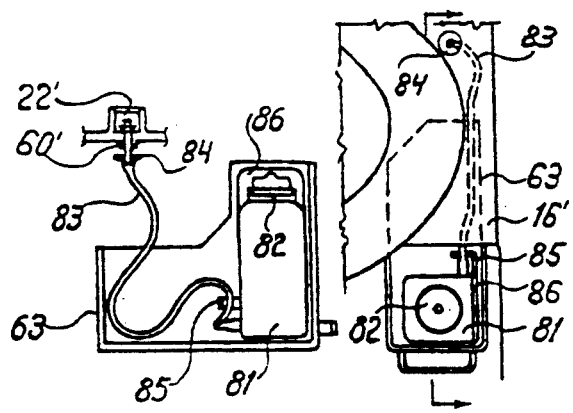
FIG. 21 is a view of the device for preparing and using a hygiene solution in a jet, with a view at the right of a fragment of a body of the combined lavatory basin-bidet and the above device connected with the solution supply chamber.

A vessel 81 shown in FIG. 21 is provided for preparation, storage and use of hygiene solutions, which are used in the bidet for admixing the water. This vessel and the parts attached to it can be made of an elastic, transparent plastic. The vessel is rectangular, located in the box 63 and accommodates for example 1.5 quarts. It has an upper neck with a cover 82 provided with a centric opening for air supply. An elastic pipe 83 for bringing the liquid from the vessel from a bottom level is connected to an extension on the vessel. The other end of the elastic pipe has a tip with an outer rib for grasping by fingers during removal or fitting on of the elastic pipe to the nipple 60' located under the top of the toilet bowl and above the box 63. The nipple 60' is mounted similarly to the above mentioned nipple 60 and is inserted in the chamber 22'. Near the extension on the vessel, a stop 85 is provided. It is used for placing of the bent elastic pipe behind it. In the pipe during its bending, the passage for passing liquid is closed. A rear wall of the vessel 81 extends upwardly beyond the vessel and forms a handle 86 for lifting the vessel from the box and for suspending it on a hook 5 shown in FIG. 3. When the vessel is suspended, the hygiene solution flows to the spray head under the action of gravity.

Figure 22:
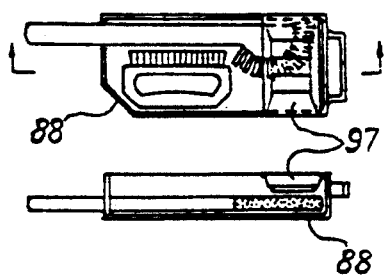
FIG. 22 is a plan view and a section view of brushes and soap dish in the box for cleaning and washing of the lower seat, the body of the lavatory basin-bidet, etc.

The insert 80 can be located in the rear part of the box 63. Special brushes are also provided for cleaning the respective devices. They can be accommodated in their receptacles in the box 88 as shown in FIG. 22. In the front part of the box 88 under the brushes, a soap holder 97 for soap is located.

The invention is not limited to the details shown, since various modifications and structural changes are possible without departing in any way from the spirit of the present invention.

What is desired to be protected by Letters Patent is set forth in the appended claims.

I claim:

1. A toilet unit, comprising a toilet room having a plurality of walls which define at least one corner intersected by a central vertical plane; and a toilet arranged in said corner of said toilet room and including an upper water tank for supplying water, a lavatory basin-bidet, a seat associated with said basin-bidet, and a spraying device associated with said seat of said basin-bidet, said water tank having a diagonal plane of symmetry which coincides with said central vertical plane of said corner of said toilet room, said water tank having an outlet connected to said basin-bidet, a float rotatably mounted in said tank, a first valve for supplying water into said water tank which has a valve member responsive to movement of said float for actuating said first valve, a second valve for discharging water into said outlet and provided with a cable arranged on a pulley for actuating said second valve, said float, said valve member, and said pulley being rotatably mounted in said tank about a single axis which extends perpendicular to said diagonal plane of symmetry of said water tank.

2. A toilet unit as defined in claim 1; and further comprising means for supporting said seat on said basin-bidet so as that said seat is turnable relative to said basin-bidet, said supporting means being formed as couplings so that water can be supplied through said couplings into said spraying device which is arranged in said seat.

3. A toilet unit as defined in claim 1; and further comprising means for controlling water supply, heating of water and air, and water discharge in said toilet, said means being arranged on a level of said seat when it is in a position applied on said basin-bidet.

4. A toilet unit as defined in claim 1; and further comprising means for controlling said spraying device, said controlling means being arranged in front of said seat when it is located in a position applied on said basin-bidet.

* * * * *